United States Patent Office 2,871,848
Patented Feb. 3, 1959

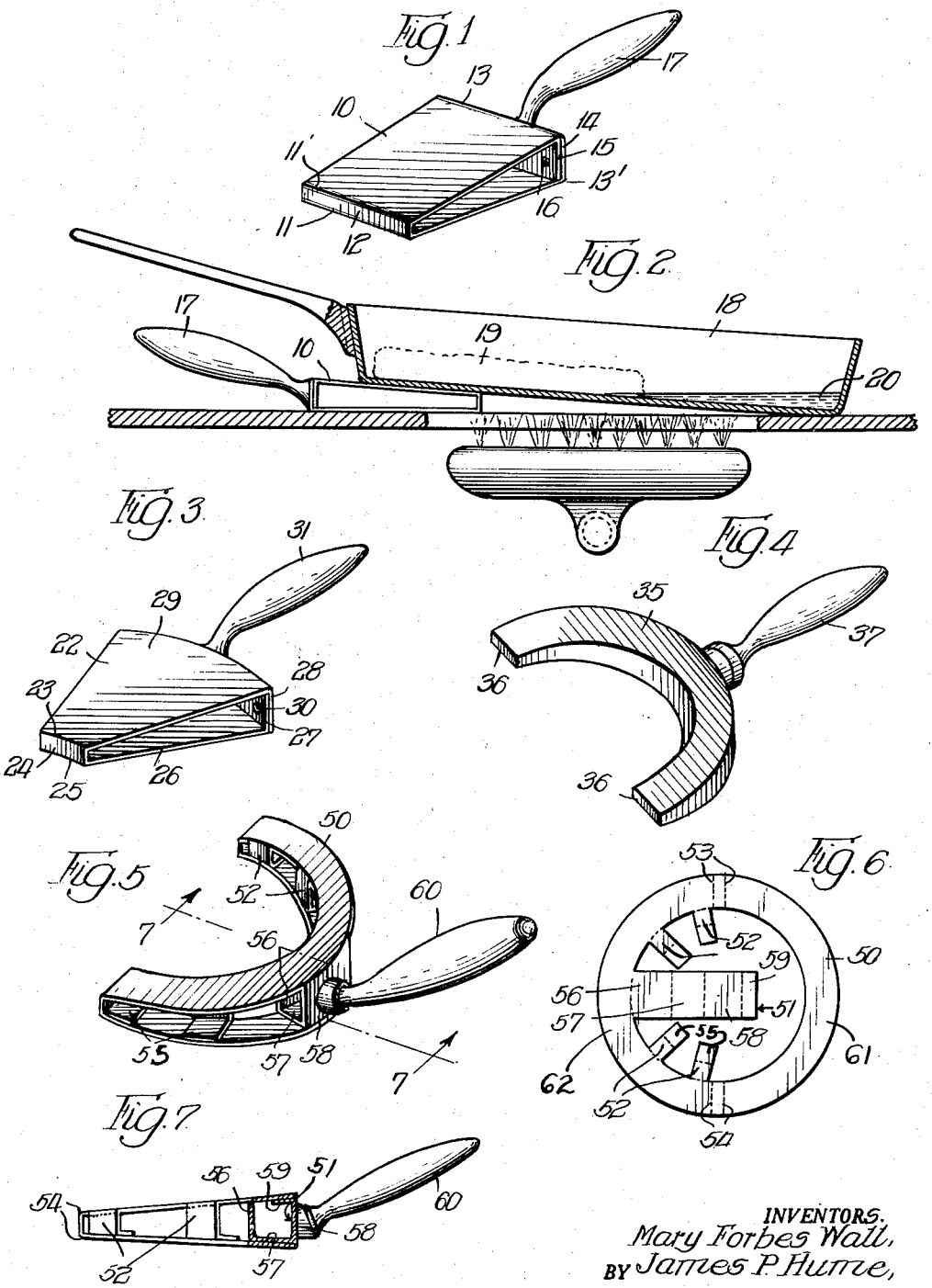

2,871,848
CULINARY UTENSILS

Mary Forbes Wall, Van Nuys, Calif., and James P. Hume, Chicago, Ill.; said Hume assignor to said Wall Application June 2, 1955, Serial No. 512,668

1 Claim. (Cl. 126—215)

This invention relates to a new and improved culinary utensil.

An object of this invention is to provide a simple and inexpensive wedge adapted to be inserted under a frying or other pan employed in cooking, when used either on top of a stove or in ovens, as may be desired.

In cooking certain dishes, it is customary to employ quantities of liquid, such as fat when frying, or aqueous fluids, such as sauces, essences or the like, and it is sometimes desirable to have the bulk of such liquids removed from or maintained out of direct association with the particular food substance while the same is being cooked. In certain instances liquids are added by the person preparing the food, and in other instances such liquids exude from or are produced by the food itself during and as a result of the cooking process.

One method of removing the food being cooked from such associated liquid is by maintaining the cooking pan or vessel in an inclined position, and thereby causing the liquid to flow by gravity to the lowest area of the pan and out of direct association or contact with the food. The utensil of this invention constitutes a conveniently formed pan-wedging device which can be readily employed by the cook for insertion under a pan or vessel for maintaining it during the cooking process in an inclined position as described.

The nature of this invention can be best understood from the following description of certain specific embodiments thereof, which are illustrated in the attached drawings by way of example. In the drawings:

Fig. 1 is a perspective view of a wedging device constructed in accordance with this invention.

Fig. 2 is an elevational view illustrating a cooking pan on top of a conventional cooking stove with wedging device of Fig. 1 interposed under the pan.

Fig. 3 is a modified form of the invention.

Fig. 4 illustrates a further modification of the invention.

Fig. 5 represents a still further modification of the invention illustrating a wedge of the general shape shown in Fig. 4 but made of sheet metal.

Fig. 6 shows the shape of the sheet metal blank from which the wedge portion of the utensil illustrated in Fig. 5 is made; and Fig. 7 is a cross-sectional view, taken on the line 7—7 of Fig. 5.

As shown in Fig. 1, the wedge device in this illustrated form is made from a rectangular sheet of steel or other suitable metal 10, which is bent as at 11 and 11' to form a leading panel 12 and is further bent at 13 and 13' to form overlapping wall portions 14 and 15, respectively. These wall portions are brought into engagement and may be riveted or otherwise attached by fasteners 16 at suitable locations so as to hold the wedge securely in its final configuration. Attached to the rear wall of the wedge is a handle 17 made of wood, plastic, or other suitable material and which is disposed at the proper angle to be readily and conveniently grasped by the cook for general use in the manner hereinabove described.

As shown in Fig. 2, the wedge may be employed for tilting a pan 18, which in the present illustration is a skillet or frying pan, so as to hold it at an angle to the top of the stove. As a result, the article of food 19 being cooked can be maintained on the higher surface of the pan while allowing the liquid, such as melted fat, essence or otherwise, shown at 20, to drain downwardly to the lower portion of the pan. In this way, the articles of food being cooked are maintained out of direct contact with the body of liquid contained in the pan.

In the form of the invention illustrated in Fig. 3, the same general construction is provided, except that the leading edge of the wedge is of diminished width in order to provide less obstruction between the source of heat and the bottom of the pan. As shown, the sheet 22 is bent as at 23 to form a downwardly depending front wall 24, which is in turn bent backwardly at 25 to form the under portion of the wedge 26. The rear wall of the wedge is formed by an upwardly bent portion 27 extending from the portion 26 and a downwardly extending overlapping wall 28 which depends from the upper surface 29. These overlapping rear wall portions are fastened as at 30 by rivets, welding, or other suitable fastening in the same manner as that illustrated in Fig. 1. Similarly, the rear wall of the wedge is equipped with a handle 31.

The forms of the invention shown in Figs. 1 and 3 are capable of holding the pan in desired tilted position with a surface contact between the upper face of the wedge and associated portion of the bottom of the pan without interposing substantial portions of the wedge between the flame or heating element of the stove and the bottom of the pan. As shown in Fig. 3, the plane contour of the wedge is in the shape of a truncated triangle which further minimizes the barrier effect of the wedge between the flame and the pan.

By constructing the wedges of this invention with leading faces instead of bringing the wedges to a sharp leading edge, a further benefit is realized in addition to that of avoiding the interpositioning of a barrier between the source of heat and the bottom of the pan. This further benefit is illustrated in Fig. 3, where it will be noted that the inclination of the upper face of the wedge is adjusted to give the desired tilt to the pan while maintaining a surface contact between the upper face of the wedge and the associated portion of the bottom of the pan. In other words, the incline of the underface of the pan is made to conform to the inclination of the upper face of the wedge, with the result that a surface contact is maintained between the pan and the wedge without projecting the wedge too far under the pan. This rim surface contact between the wedge and the pan establishes a secure and satisfactory support for the pan.

If pans of different diameters are employed with the same wedge, the wedge can be manipulated by a slight inward or outward movement as may be required, to establish the necessary surface contact between the upper face of the wedge and the bottom of the pan, and at the same time give the desired tilt to the pan as a whole.

Referring now to the form of the invention illustrated in Fig. 4, the wedge 35 is constructed in plane configuration as an arc with its upper and lower faces constituting the faces of the wedge. The arc is preferably formed with leading faces 36 and the device is equipped with a suitable handle 37 so as to be conveniently grasped and utilized by the cook. The wedge of this modification may be made of solid metal formed by casting or otherwise, and its shape is such as to cause the wedge to engage the periphery of the bottom of the pan with which it is used and to leave the central portion of the pan fully exposed for direct contact with the flame or heating element of the stove.

In order to preserve the advantages of the type of construction illustrated in Fig. 4 and at the same time avoid the expense of having solid or cast metal parts, a device of the construction illustrated in Fig. 5 may be formed of sheet metal and at a relatively small expense.

In Fig. 6, there is illustrated a blank of sheet metal from which the wedge of Fig. 5 may be formed. The blank is an annular shaped sheet metal member 50 having tabs 51—52 formed on the inside thereof. The blank is adapted to be bent along lines 53—53 and 54—54 so that one of the opposed arcuate portions overlies the other in the manner illustrated in Fig. 5. The respective surfaces defined by so bending the annular member are shown at 61 and 62. Next, the tabs 52—52 are bent downwardly and secured by means of inwardly extending flanges 55—55 to the underlying arcuate portion of the metal. The larger tab 51 is likewise bent downwardly so that the portion 56 thereof forms an inner support, and the section 57 thereof overlies the lower arcuate portion of the wedge and is secured to it by welding, riveting, or other suitable form of attachment. The additional portion of tab 51 is bent upwardly to form a section 58 which constitutes the rear wall for the wedge as shown in Fig. 7, and the final portion 59 of tab 51 is bent at right angles to the rear wall and is secured to the under surface of the upper arc of the wedge. This forms a box-like construction at the rear center of the wedge which not only acts as a support and bracing member for strengthening the wedge but also serves as a mounting for a suitable handle 60 which may be connected by rivets, bolts, or other fastening means.

It will be readily understood that the wedges of this invention, when constructed in the manner described, will provide a highly satisfactory, efficient tool for use in the kitchen for maintaining cooking pans on an inclined angle in the manner and for the purpose described.

What is claimed is:

A culinary utensil of the character described, comprising an arcuate wedge body portion formed by overlapping sheet metal members bent from a single annular sheet metal blank, intermediate straps extending between and holding said overlapping members in spaced relation, a central support extending between said members and forming a heel surface for mounting a handle and a handle secured to said heel surface, said overlapping members being disposed on converging planes and having such angularity and spacing as to maintain a pan supported thereon at a predetermined angle to the horizontal.

References Cited in the file of this patent

UNITED STATES PATENTS

| Re. 20,389 | Pickett | June 1, 1937 |
| D. 168,534 | Council | Jan. 6, 1953 |
| 1,093,033 | Canby | Apr. 14, 1914 |
| 1,465,302 | Haskel | Aug. 21, 1923 |
| 1,974,796 | Davis | Sept. 25, 1934 |
| 2,080,171 | Fairbanks | May 11, 1937 |
| 2,733,894 | Overman | Feb. 7, 1956 |

FOREIGN PATENTS

| 770,275 | France | Sept. 11, 1934 |
| 803,318 | France | Sept. 28, 1936 |
| 512,420 | Great Britain | Sept. 15, 1939 |
| 570,249 | Great Britain | June 28, 1945 |